US006974542B2

(12) United States Patent
von Phul

(10) Patent No.: US 6,974,542 B2
(45) Date of Patent: *Dec. 13, 2005

(54) METHOD AND APPARATUS FOR REMOVING FOAMING CONTAMINANTS FROM HYDROCARBON PROCESSING SOLVENTS

(76) Inventor: Stephen A. von Phul, P.O. Box 1393, Weatherford, TX (US) 76086-1393

( * ) Notice: Subject to any disclaimer, the term of this patent is extended or adjusted under 35 U.S.C. 154(b) by 118 days.

This patent is subject to a terminal disclaimer.

(21) Appl. No.: 10/443,247

(22) Filed: May 22, 2003

(65) Prior Publication Data

US 2003/0205534 A1 Nov. 6, 2003

Related U.S. Application Data

(62) Division of application No. 09/794,286, filed on Feb. 27, 2001, now Pat. No. 6,602,423.

(51) Int. Cl.[7] ........................... B01D 1/00; B01D 19/00

(52) U.S. Cl. ................... 210/221.2; 210/703; 423/228; 423/229; 96/179; 96/180; 96/355; 95/187; 95/231; 95/237

(58) Field of Search ............................. 210/221.2, 703; 95/187, 231, 235, 237; 423/228, 229; 96/179, 96/180, 355

(56) References Cited

U.S. PATENT DOCUMENTS 2,730,240 A 1/1956 Johnson
3,371,779 A 3/1968 Hollingsworth et al.
3,479,281 A 11/1969 Kikindai et al.
3,577,868 A 5/1971 Muller
4,287,161 A 9/1981 Agrawal
4,849,027 A 7/1989 Simmons
4,948,512 A 8/1990 Gotlieb et al.
5,006,258 A 4/1991 Veatch et al.
5,011,597 A 4/1991 Canzoneri et al.

(Continued)

OTHER PUBLICATIONS

Stephen A. von Phul, Michelle Hewitt, Jimmy Wallum, Perry Equipment Corporation, *Predicting Coalescer Performance*, ppg. 239-261.

(Continued)

*Primary Examiner*—Thomas M. Lithgow
(74) *Attorney, Agent, or Firm*—Geoffrey A. Mantooth

(57) ABSTRACT

A column of solvent containing foaming contaminants is provided. Gas is educted into the solvent in the column so as to generate foam in the column. The gas is educted into the column independently of the input flow of solvent into the solvent using a pumparound arrangement with the solvent. Foam generation continues so as to push the foam up in the column, wherein much of the solvent that is in the foam is allowed to drain back down into the column. The foam passes through concentrators which increase the residency time of the foam in the column to further dry the foam and to create larger bubbles. The drier foam is pushed out of the column and into a container. The foam is broken up into gas and the liquid foaming contaminants. The gas is recirculated for injection into the column even after foaming has stopped. The foaming contaminants are concentrated at the surface level of the solvent in the column. These contaminants are removed from the column. A liquid separator separates immiscible liquids, such as oil, from the solvent.

18 Claims, 6 Drawing Sheets

U.S. PATENT DOCUMENTS

| | | | |
|---|---|---|---|
| 5,019,361 A | 5/1991 | Hakka | |
| 5,393,505 A | 2/1995 | Audeh | |
| 5,587,004 A | 12/1996 | Mogi | |
| 5,662,790 A | 9/1997 | Carlton et al. | |
| 6,080,320 A | 6/2000 | von Phul | |
| 6,602,423 B2 * | 8/2003 | von Phul | 210/703 |

OTHER PUBLICATIONS

Dennis Weaire, Stefan Hutzler, *The Physics of Foams*, ppgs. 98-1001, Oxford University Press, Great Clarendon Street, Oxford, New York, published 1999.

James E. Bailey, *Biochemical Engineering Fundamentals*, ppgs. 498-500, Copyright 1986, 1977 by McGraw-Hill, Inc., Library of Congress Cataloging-in-Publication Data.

James Peter, *Handbook of Separation Techniques for Chemical Engineers*, ppgs. 3-53-3-59, Copyright 1979 by McGraw-Hill, Inc., Library of Congress Cataloging-in-Publication Data.

John H. Perry, *Chemical Engineers Handbook*, ppgs. 18-80. 18-81, 18-93, Copyright 1973, 1963 by McGraw-Hill, Inc., Library of Congress Cataloging-in-Publication Data.

* cited by examiner

METHOD AND APPARATUS FOR REMOVING FOAMING CONTAMINANTS FROM HYDROCARBON PROCESSING SOLVENTS

This is a divisional application of application Ser. No. 09/794,286, filed Feb. 27, 2001 Now U.S. Pat. No. 6,602,423.

FIELD OF THE INVENTION

The present invention relates to apparatuses and methods for removing contaminants that can cause foaming in solvents that are used to process hydrocarbons such as natural gas.

BACKGROUND OF THE INVENTION

Hydrocarbon gas is frequently processed before storage, transportation through a pipeline or use. Processing removes undesirable components from the gas, such as moisture or sour contaminants.

Processing gas to remove moisture is referred to as dehydration. Hydrocarbon gas containing moisture is typically dehydrated by exposing it to the solvent triethylene glycol. The moisture is removed from the hydrocarbon gas in order to increase the heating value of the gas and to reduce the condensation of free liquid water during transportation or storage. The removal of the moisture also reduces the formation of gas hydrates that foul pipeline equipment.

In a typical glycol dehydration unit, the gas is dehydrated in a gas-liquid contactor, which is typically a tower. The wet gas enters the contactor at the bottom, while the dry gas exits from the top. Inside of the contactor, the gas passes through a shower of glycol solvent. The lean liquid solvent enters the contactor at the top and the rich liquid solvent (solvent containing moisture) exits the contactor from the bottom. The liquid solvent drains down inside of the contactor through a series of internal trays or packing. The gas is forced up through the solvent shower. When the gas physically contacts the liquid solvent, the mass of the water vapor in the gas is transferred to the solvent.

The rich solvent is processed for reuse. Reusing the solvent is desirable for environmental reasons (disposal of the solvent is both difficult and expensive) and also because replacing the solvent is expensive. Processing the solvent removes the moisture wherein the solvent is said to be lean.

Processing gas to remove sour contaminants is referred to as sweetening. Sour gas smells like rotten eggs. The sour contaminants are sulfur compounds (for example, hydrogen sulfide). These sulfur-containing compounds are removed because, when the compounds are combined with water, sulfuric acid is formed. Another contaminant in the gas is carbon dioxide. When the carbon dioxide is combined with water, carbonic acid is formed. Removing these acid forming contaminants is desirable in order to minimize corrosion in the vessels and pipelines used to store and transport the gas.

The gas sweetening process is similar to the dehydration process. The gas is forced upward through a shower of sweetening solvent in a gas-liquid contactor. The sweetening solvent is an amine solvent. The contaminants are removed by the sweetening solvent.

The sweetening solvent is processed for reuse, for the same reasons that the dehydration solvent is processed for reuse. Processing the solvent removes the sour contaminants.

In both the dehydration process and the sweetening process, the gas-liquid contactor requires careful balancing of the physical parameters of the gas and the liquid. When the contactor is in equilibrium, the gas exits out of the top and the rich solvent (the solvent being rich with either moisture or sour contaminants) exits out of the bottom, as described above. Also, when the system is in equilibrium, the amount of gas that is processed is maximized.

One sign that equilibrium is lost is when some of the liquid solvent is carried out of the contactor with the gas. This occurs if the gas rate through the contactor is too high or if the solvent contains relatively high concentrations of foaming contaminants. Such foaming contaminants include well treatment chemicals, liquid hydrocarbons (such as crude oil), corrosion inhibitors, suspended solids and excessive amounts of antifoam chemicals. Foaming is evident when the foam exits the top of the contactor. This is known as "carrying over" or "puking".

Foaming of the solvent is undesirable because foaming leads to a loss of efficiency of the contactor, causes contamination of the gas with the solvent, and results in the loss of the expensive solvent.

In the prior art, attempts have been made to solve the foaming problem. The prior art treats the solvent by passing it through activated carbon to adsorb the foam causing surfactants. In addition, the solvent is passed through filters to remove small suspended particles. Such particles stabilize the foam once it is formed.

The prior art systems suffered from several problems. The filters require replacement and disposal. Disposal of the used filters can be expensive due to environmental concerns. In addition, the filters themselves are expensive. Filters are also very specialized, being suited only to a narrow range of contaminant types or sizes. It is difficult to select a proper type of filter for the particular foaming contaminant present in the solvent. That is to say that the effectiveness of the filter is dependent on the filter matching the particular type of the foaming contaminant. Typically, the particular type of foaming contaminant is unknown, resulting in guess work as to the particular filter which is to be used.

My U.S. Pat. No. 6,080,320 teaches a method and apparatus for removing foaming contaminants from solvents. I have made improvements to both the method and the apparatus.

One of these improvements provides a much cleaner solvent than ever before obtained, thereby increasing the overall efficiency of the hydrocarbon processing. Foaming contaminants comprise surfactants. In the gas-liquid contactor, a frothing is desired in order to remove the impurities (water, sour contaminants, etc.) from the hydrocarbon gas. This process is known as mass transfer, wherein the impurities are transferred from the hydrocarbon gas to the liquid solvent.

The presence of foaming contaminants reduces the efficiency of the gas-liquid contactor. This is because the foaming contaminants resist the transfer of mass from the gas to the liquid, thereby reducing the quantity of mass that is transferred. The quantity of mass transferred is adversely affected even if the contactor does not exhibit signs of foaming (such as foam production at the top of the contactor or variations in the pressure at the gas outlet). In the prior art, the operator of the contactor detects a foaming problem by detecting foam at the top of the contactor or by a pressure change in the gas outlet. If foam is detected, then the operator adds anti-foaming agents to the solvent.

However, the contactor efficiency is reduced even by a quantity of foaming contaminants that is too small to cause detectable foaming. Thus, even if foaming is undetected by the operator, the efficiency is likely to be relatively low. Furthermore, the addition of anti-foaming agents does not reduce the amount of foaming contaminants. Instead the anti-foaming agents work to reduce the stability of the foam; the foaming contaminants are not tied up. Consequently, the foaming contaminants continue to adversely affect the contactor efficiency.

Another improvement eliminates the need for a compressor to introduce the gas into the apparatus as well as making the introduction of gas independent on the solvent inlet flow. The gas is used to create foam for the removal of the foaming contaminants. Compressors are expensive and can be bulky. An eductor can be used in the solvent input line, but this makes the flow of gas into the apparatus dependent upon the flow of solvent into the apparatus.

Still another improvement modifies the structure of the foam that is generated. Modifying the foam structure results in a drier foam (one that contains less solvent) and bubbles that are more easily broken for ultimate recovery of the liquid component of the foam.

Still another improvement isolates unwanted liquids from the solvent, such as oil. This results in cleaner solvent.

SUMMARY OF THE INVENTION

It is an object of the present invention to provide a method and apparatus for improving the mass transfer capabilities in hydrocarbon processing.

It is another object of the present invention to provide an improved method and apparatus for removing foam contaminants from hydrocarbon fluid processing solvents.

It is another object of the present invention to provide a method and apparatus for removing foam contaminants from hydrocarbon fluid processing solvents which provides gas to the solvent independently of the solvent flow.

It is another object of the present invention to provide a method and apparatus for removing foam contaminants from hydrocarbon fluid processing solvents, wherein the foam structure is modified to reduce solvent content and to make the foam more manageable.

It is another object of the present invention to provide a method and apparatus for removing liquid contaminants from hydrocarbon fluid processing solvents.

The present invention provides a method of removing contaminants from a solvent which is used to process hydrocarbon fluids. A column is provided, which column has a top end. The contaminated solvent is introduced into the column at a first location. The contaminated solvent is in a liquid form and has a top level within the column. Gas is introduced into the contaminated solvent in the column at a second location that is below the first location so as to generate bubbles in the liquid and drive the contaminants to the top level of the liquid. The contaminants are removed from the top level of the liquid.

In accordance with one aspect of the present invention, the solvent is removed from the column at a third location that is below the second location.

The present invention also provides a method for removing foaming contaminants from solvent which is used to process hydrocarbon fluids. A column having a top end and a carryover coupled to the top end of the column is provided. The contaminated solvent is introduced into the column at a first location. Gas is introduced into the column at a second location that is located below the first location, whereby foam is generated in the column. The foam comprises the gas, the solvent and the foaming contaminants. Foam generation is continued so as to push the foam into the carryover and out of the column, whereby a portion of the foaming contaminants are removed from the column. Gas introduction at the second location is continued even after foaming stops so as to drive the foaming contaminants to a top level of the liquid solvent and the column. The solvent is removed from the column at a third location that is below the second location.

In accordance with another aspect of the present invention, the foaming contaminants are removed from the top level of the liquid.

In accordance with still another aspect of the present invention, the step of introducing gas into the column at a second location further comprises the step of removing gas from the column at a location above a surface level of the liquid and educting the gas with a flow of solvent taken from the column.

In accordance with still another aspect of the present invention, the flow of solvent into the column for educting gas is greater than the flow of solvent into the column at the first location.

In accordance with another aspect of the present invention, the foam is coarsened as it is pushed, whereby the foam becomes drier and easier to shear.

In accordance with another aspect of the present invention, the contaminated solvent comprises immiscible liquid, wherein the method further comprises the step of separating the immiscible liquid, from the solvent as the solvent is introduced into the column.

In accordance with still another aspect of the present invention, the immiscible liquid is separated from the solvent at either the first location or the second location or both.

In accordance with another aspect of the present invention, the step of introducing gas into the column at a second location further comprises the step of removing gas from the column at a location above a surface level of the liquid and educting the gas with the flow of solvent taken from the column. The foam is coarsened as it is pushed, whereby the foam becomes drier and easier to shear. The contaminated solvent comprises immiscible liquid, which immiscible liquid is separated from the solvent as the solvent is introduced into the column.

The present invention also provides a facility for processing hydrocarbons utilizing solvent to remove contaminants from the hydrocarbons. The solvent contains foaming agents. There is provided a fluid-liquid contactor having a hydrocarbon input, a hydrocarbon output, a lean solvent input and a rich solvent output. A solvent recycler is connected between the lean solvent input and the rich solvent output, the solvent recycler processing rich solvent exiting through the rich solvent output into lean solvent for introduction into the contactor by way of the lean solvent input. A column has a top end, it has a solvent inlet in a first location. The solvent has a gas inlet in a second location that is below the first position, wherein gas bubbles up through the solvent in the column. The column having a solvent output in a third location located below the second location. The solvent inlet and solvent outlet are connected to the solvent recycler. An outlet in the column is located in a liquid surface level of the column, wherein contaminants can be removed through the outlet from the column.

A method is provided for removing foaming contaminants from solvent which is used to process hydrocarbon fluids. A column is provided having a top end, the top end having an outlet that provides communication between the column and a container. The contaminated solvent is introduced into the column at a first location. At a second location, gas that is obtained from either the column or the container using the solvent from the column is educted into the contaminated solvent so as to drive the foaming contaminants to the top level of the solvent. The contaminants are removed from the top level of the solvent.

In accordance with still another aspect of the present invention, the step of removing the contaminants from the top level of the solvent further comprises the step of generating foam so as to push the foam up the column, and allowing a portion of the solvent in the foam to drain back down the column, wherein the foam at the top end of the column has less solvent than the foam that is lower in the column, and pushing the foam out through the outlet and into the container and removing the solvent from the column by way of a location that is below where the gas is injected.

In accordance with still another aspect, the present invention further comprises the step of coarsening the foam as it is pushed, whereby the foam becomes drier and easier to shear.

In accordance with still another aspect of the present invention, the flow of solvent into the column for educting gas is greater than the flow of solvent into the column at the first location.

In accordance with still another aspect of the present invention, there is provided the step of separating immiscible liquid from the solvent as the solvent is introduced into the column.

The present invention provides a method of removing foaming contaminants from solvent which is used to process hydrocarbon fluids. A column having a top end, the top end having an outlet that provides communication between the column and a container. The contaminated solvent is introduced into the column. Gas is introduced into the contaminated solvent so as to generate foam in the column, the foam comprising the gas, the solvent and the foaming contaminants. Foam is continued to be generated so as to push the foam up the column. Passing the foam through at least one concentrator so as to dry the foam and form larger bubbles and pushing the foam out through the outlet and into the container. The solvent is removed from the column by way of a location that is below where the gas is injected.

DESCRIPTION OF THE PREFERRED EMBODIMENT

Figure 1:
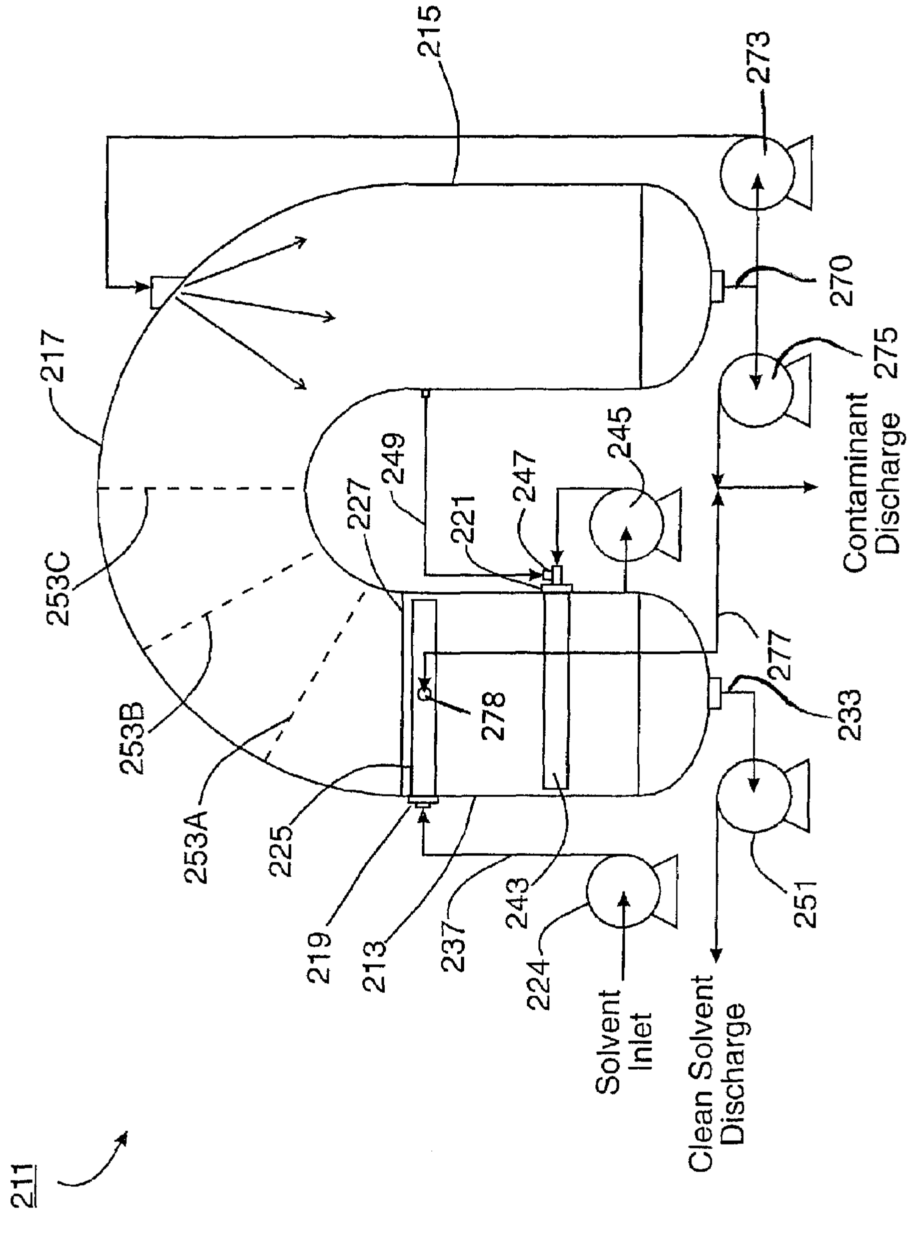
FIG. 1 is a side view of the apparatus of the present invention, in accordance with a preferred embodiment.

The present invention is used to remove contaminants, such as surfactants, from solvent that is in turn used to process hydrocarbon gas (such as natural gas). A predecessor system and method was disclosed in my earlier U.S. Pat. No. 6,080,320. The complete disclosure of U.S. Pat. No. 6,080,320 is incorporated by reference herein.

Examples of hydrocarbon gas processing units include dehydration units and sweetening units. The present invention can also be used on solvents that are used to process hydrocarbon liquids.

Dehydration units and sweetening units have solvent recycling equipment. The solvent recycling equipment takes the rich solvent and removes the moisture or sour contaminants to produce lean solvents.

The foam remover apparatus 211 of the present invention can be installed and operated in conjunction with the solvent recycling equipment. As the solvent circulates through the gas-liquid contactor, it takes up contaminants (for example, moisture or sour contaminants) from the gas. The solvent may also take foaming contaminants from the gas. The solvent exits the gas-liquid contactor and enters the solvent recycling equipment. The solvent recycling equipment will remove moisture and sour contaminants from the gas, but not the foaming contaminants. Consequently, some of the solvent is processed by the foam remover apparatus 211 to remove the foaming contaminants.

The foam remover apparatus 211 has a first column 213, a second column 215 and a conduit 217 or carryover connecting the upper ends of the first and second columns 213, 215.

The first column 213 has a solvent inlet 219 that is connected to a tap in the solvent recycling system, a gas inlet 221 and a solvent outlet 223.

Figure 2:
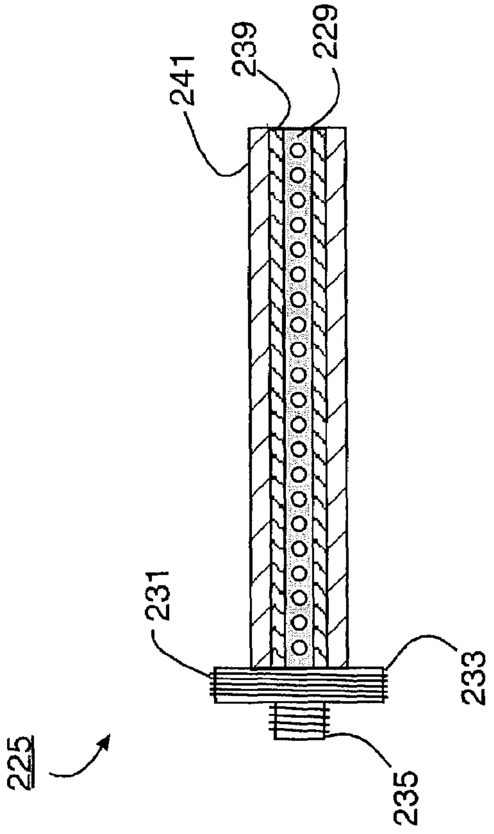
FIG. 2 is a cross-sectional view of the liquid-liquid separator.
Figure 3:
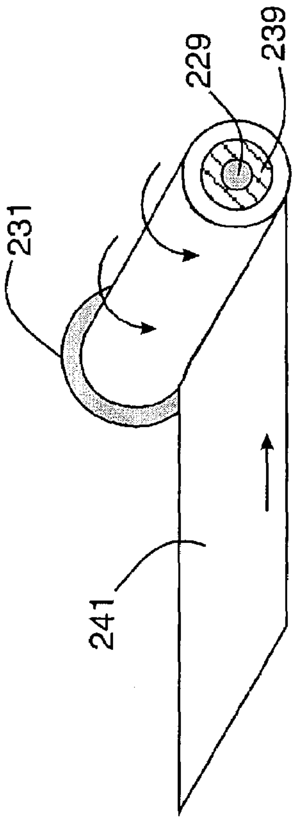
FIG. 3 is a view showing the manufacture of the liquid-liquid separator.

The solvent inlet 219 is connected to a solvent inlet pump 224. The pump 224 pumps solvent from the solvent recycling system into the first column. A liquid-liquid separator 225 is located inside of the first column 213 below the liquid level 227. Referring to FIG. 2, the separator 225 has a perforated pipe 229 or tube, one end of which has a fitting 231. The fitting 231 has a threaded coupling 233 to couple to a wall of the first column 213 and another threaded coupling 235 to couple to the solvent input line 237 (see FIG. 1). The other end of the pipe 229 is closed. The pipe 229 is wrapped with a screen material 239, 241. In the preferred embodiment, the screen 239, 241 is a shaved metal or steel wool. Two wraps 239, 341 are provided. The wraps of steel wool can have different porosities. For example, the inner wrap 239 can be less porous or finer than the outer wrap 41. As shown in FIG. 3, the screen can be applied by rolling the pipe 229 inside of the sheet of steel wool. Preferably, the steel wool allows solids to flow through in order to prevent the accumulation and eventual blockage of the screen.

Referring back to FIG. 1, the gas inlet 221 is connected to a sparger 243 located inside of the first column 213 and below the separator 225. The sparger 243 can be substantially identical to the separator 225. In the preferred embodiment, gas is educted into the sparger from the second column 215. The eduction fluid is the solvent, as pumped from the first column 213 in a pump around arrangement. A pump 245 withdraws solvent from a location in the first column 213 that is below the sparger 243. The pump 245 injects the solvent through an eductor 247 and into the sparger 243. The gas from the second column 215 is drawn into the eductor via line 249 from the second column 215 and thus into the sparger 243.

The solvent outlet 223 is located below the sparger 243 and may be located at the bottom of the first column 213. A pump 251 withdraws the clean solvent from the first column 213 and reintroduces it into the solvent recycling system.

The first column 213 and the conduit 217 are fitted with one or more concentrators 253A, 253B, 253C, such as coarsening screens. The screens extend across the path of the foam as the foam moves from the first column 213 into the second column 215. The concentrators are used to modify the foam by drying the foam and by manipulating the bubble size to a more shearable condition. In the preferred embodiment, as shown in FIG. 1, three screens are used. The first screen 253A, closest to the liquid level 227 of the first column 213, has relatively large perforations. The second screen 253B, next closest to the liquid level of the first column, has relatively small perforations. The third screen 253C, closest to the second column, has the largest perforations.

Figure 4A:
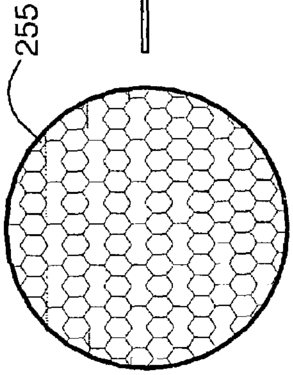
FIGS. 4A and 4B are plan and side views respectively of a concentrator, in accordance with a preferred embodiment.
Figure 4B:
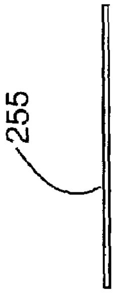

FIGS. 4A–9B schematically illustrate various types of concentrators. In FIGS. 4A and 4B, the concentrator is an expanded metal grating 255. (FIG. 4A shows a plan view, FIG. 4B shows a side or edge view.) The grating 255 is circular in circumference, so as to fit into the conduit 217. The grating 255 is typically transverse to the path of the foam traversing the conduit 217, although it need not be so.

Figure 5A:
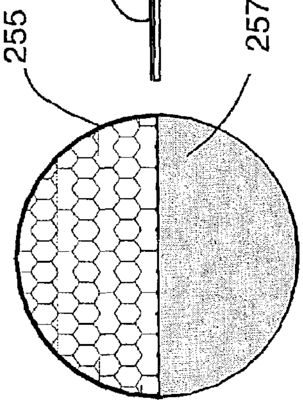
FIGS. 5A and 5B are plan and side views respectively of a concentrator, in accordance with another embodiment.
Figure 5B:
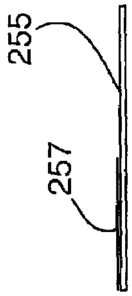
Figure 9A:
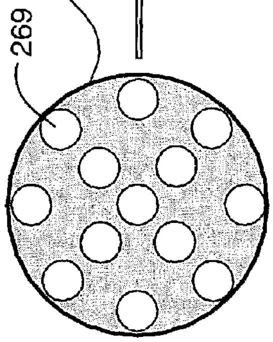
FIGS. 9A and 9B are plan and side views respectively of a concentrator, in accordance with another embodiment.

In FIGS. 5A and 5B, the concentrator includes an imperforate plate 257 that partially closes the conduit to the passage of foam. The plate does not completely close off the conduit 217; the remaining opening is filled with an expanded metal grating 255 or other type of screen (such as is shown in FIGS. 6A, 7A and 9A).

Figure 6A:
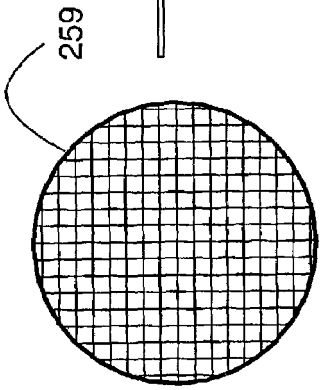
FIGS. 6A and 6B are plan and side views respectively of a concentrator, in accordance with another embodiment.
Figure 6B:
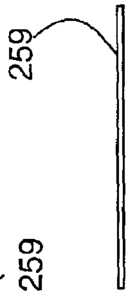

In FIGS. 6A and 6B, the concentrator is a screen 259 or mesh. The screen 259 may require stiffening elements or supports to span across the conduit 217.

Figure 7A:
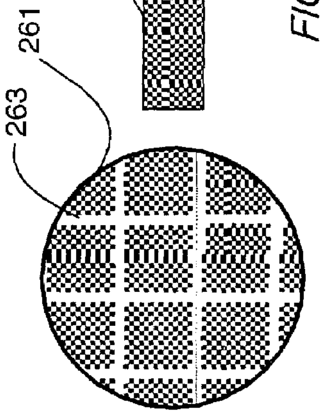
FIGS. 7A and 7B are plan and side views respectively of a concentrator, in accordance with another embodiment.
Figure 7B:
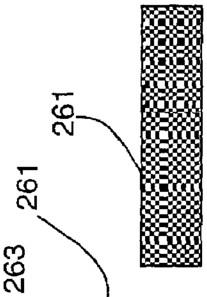

In FIGS. 7A and 7B, the concentrator is a pack of steel wool 261. As shown in FIG. 7B, the pack is thicker than a grating 255 or screen 259. Supports 263 are provided to contain and support the steel wool inside of the conduit 217. The steel wool pack drains liquid quite well from the foam passing therethrough. In addition, the bubbles exiting the steel wool pack tend to be small or fine.

Figure 8B:
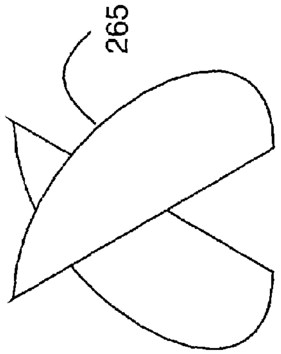
FIGS. 8A and 8B are plan and side views respectively of a concentrator, in accordance with another embodiment.
Figure 8A:
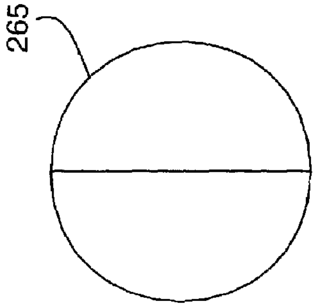

In FIGS. 8A and 8B, the concentrator includes helical vanes or baffles 265 that direct the foam along a helical path inside the conduit, thus effectively lengthening the distance the foam must traverse to reach the second column. The longer distance allows the foam to dry more.

Figure 9B:
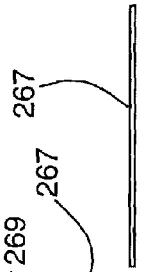

In FIGS. 9A and 9B, the concentrator is a metal plate 267 with perforations 269 formed therein (such as by punching or by drilling).

Thus, as can be seen by FIGS. 4A–9B, there are a wide variety of concentrators for drying the foam and changing the bubble size. Other types of concentrators can be used as well.

The conduit 217 forms, in the preferred embodiment, an upside down “U”, although other shapes can be utilized. The concentrators drain solvent from the foam. Therefore, the concentrators are located so that the solvent draining therefrom flows into the first column, instead of the second column.

A drain line 270 is at the bottom of the second column 215. A pump 273 recirculates fluid from the drain line 270 to a spray head 271. Another pump 275 discharges fluid from the drain line 270. The first column 213 has an opening in the wall at or slightly below the surface level 227. This opening 278 is connected to a line 277, which in turn leads to the contaminant discharge.

Figure 10:
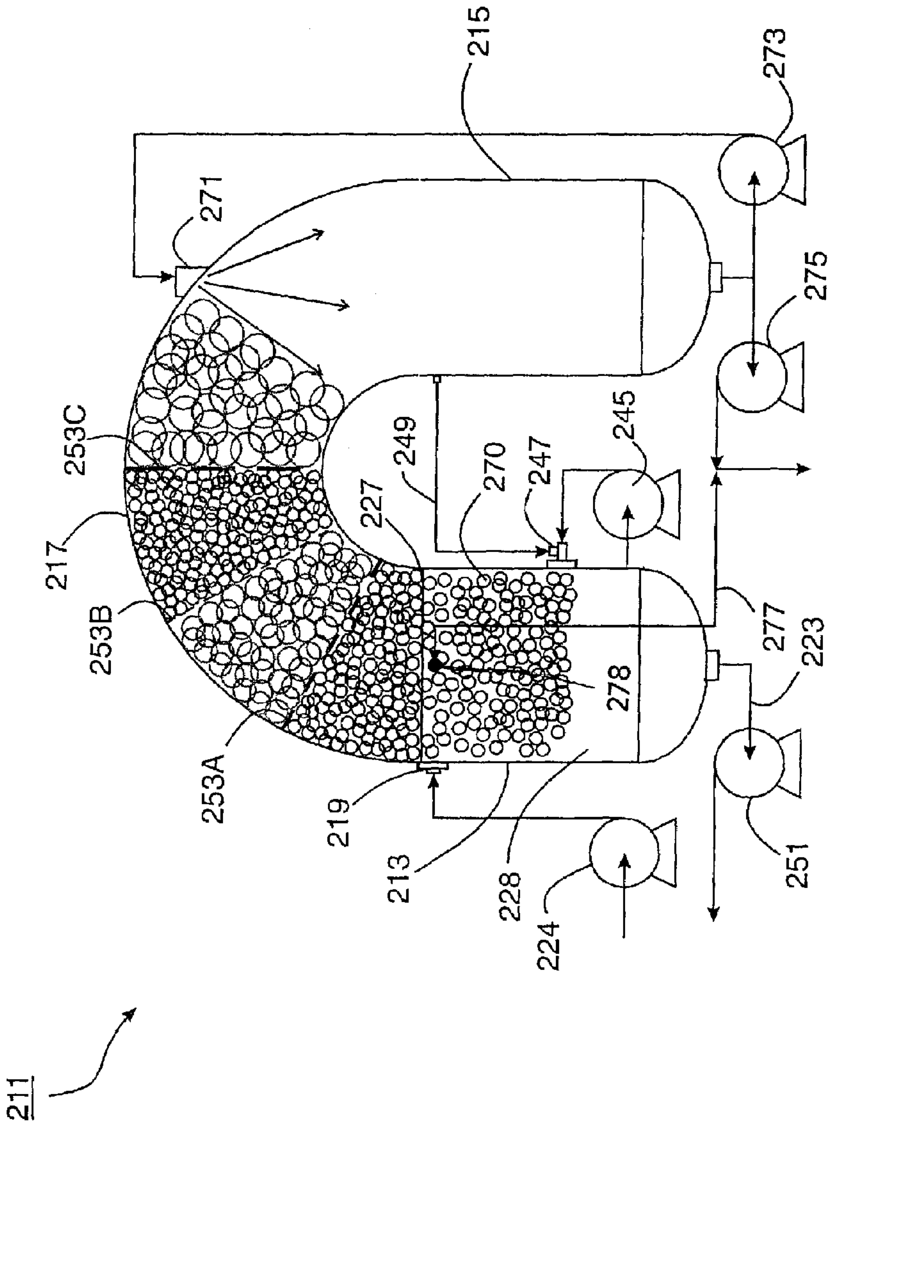
FIG. 10 is a side view of the apparatus of the present invention, without a liquid-liquid separator at the solvent input and without a sparger, shown during foaming.

The operation of the apparatus 211 will now be described with respect to FIG. 10. The apparatus of FIG. 10 is not equipped with a liquid-liquid separator 225 or a sparger 243.

The contaminated solvent is pumped into the first column 213 by the pump 224 via the solvent input 219. The level 227 of liquid solvent 228 in the first column 213 is maintained relatively constant. Above the solvent in the conduit 217 and the second column 215 is gas. A portion of this gas is removed by the line 249 and is educted into the solvent 228 in the first column 213, wherein gas bubbles 270 are formed in the solvent. The gas is educted using a pumparound arrangement, wherein solvent is removed from the first column 213 and reintroduced by way of the eductor 247. The pumparound arrangement allows the amount of gas that is introduced into the first column to be independent of the amount of solvent that is introduced into the first column. In the preferred embodiment, the pump around pump 245 pumps more volume than does the solvent inlet pump 224. For example, the pumparound pump 245 can pump 150 gpm (gallons per minute), while the solvent inlet pump 224 pumps only 5–7 gpm. (These volumes can of course vary depending on the physical size of the apparatus 211.) This allows for much more gas to be introduced into the solvent to concentrate the foaming contaminants, wherein the efficiency of the apparatus is increased. The eductor 247 functions as a sparger, wherein the gas is injected into the first column 213 in a distributed manner.

If the concentration of foaming contaminants in the solvent is high enough, foam will be produced above the solvent surface level 227. The constant production of foam in the first column 213 forces the foam through the concentrators 253A, 253B, 253C in the conduit 217 and into the second column 215. As the foam rises and passes through the concentrators 253A, 253B, 253C, the foam is coarsened, wherein it is dried due to the increased residency time in the first column and due to the foam contacting draining structure on the concentrators. As the foam passes through a concentrator, such as a screen 259 (see FIG. 6A), some of the liquid in the foam contacts the screen mesh and is drawn by gravity down along the mesh to the wall of the conduit 217 and from there drains into the reservoir of solvent in the first column. Thus, the concentrators should be angled with respect to the horizontal in order to allow this draining function to occur. The first concentrator 253A has relatively large perforations so that the foam emerging from the first concentrator has coarser, or larger bubbles, than the foam that is just below the first concentrator. Foam with relatively large bubbles drains or dries quicker than does foam with relatively small bubbles. This coarsened foam then proceeds to the second concentrator 253B, which concentrator has smaller perforations than does the first concentrator. As the foam passes through the second concentrator, the foam again is dried because some of the liquid in the foam will contact the solid elements of the concentrator and be drained to the wall of the conduit. The foam that emerges from the second concentrator 253B is somewhat finer due to the finer perforations of the second screen. Providing a concentrator with fine perforations produces a drier foam. The foam then proceeds through the conduit and enters the third concentrator 253C, which has relatively large perforations. Again the foam is dried. The foam that emerges from the third concentrator has relatively large bubbles. The combination of large bubbles in the foam and a relatively dry foam (because much of the liquid has been drained away by the concentrators) produces a foam that can be easily sheared. The foam continues on through the conduit where it enters the second column 215. A spray head 271 sprays solvent obtained from the bottom of the second column 215 onto the foam. The liquid spray shears the foam and causes any remaining solvent and foaming contaminants in the foam to fall to the bottom of the second column. This liquid in the bottom of the second column is recirculated by the pump 273 back up to the spray head. In addition, some of the liquid is periodically removed from the second column 215 and discharged by the discharge pump 275.

The concentrators 253 are located so as to drain solvent into the first column. The number, spacing and type of concentrators can vary from the example described herein.

The apparatus 211 thus effectively removes the foaming contaminants from the solvent and does so with a minimal waste of solvent. The foaming contaminants will eventually be removed from the solvent to the point of such a low concentration wherein the foaming can no longer be sustained in the conduit 217. Even though foaming can no longer be sustained, the solvent still is likely to have foaming contaminants. These foaming contaminants, even at low concentrations, can adversely affect the mass transfer in the hydrocarbon fluid processing.

The invention can further reduce the concentration of foaming contaminants in the solvent, wherein the mass transfer efficiency of the solvent is increased. The solvent continues to be introduced into the apparatus 211 for further removal of foaming contaminants. The introduction of gas into the solvent by the eductor 247 concentrates the foaming contaminants at or near the surface level 227 of the solvent. The drain line 277 has an opening 278 located at the surface level of the solvent in the first column. From time to time, a valve in the drain line 277 is opened and some of the liquid (containing the foaming contaminants and some solvent) is discharged through the drain line 277. In this manner, the concentration of foaming contaminants in the solvent can be further reduced, thereby increasing the efficiency of mass transfer of the solvent in a gas-liquid contactor during hydrocarbon processing.

Figure 11:
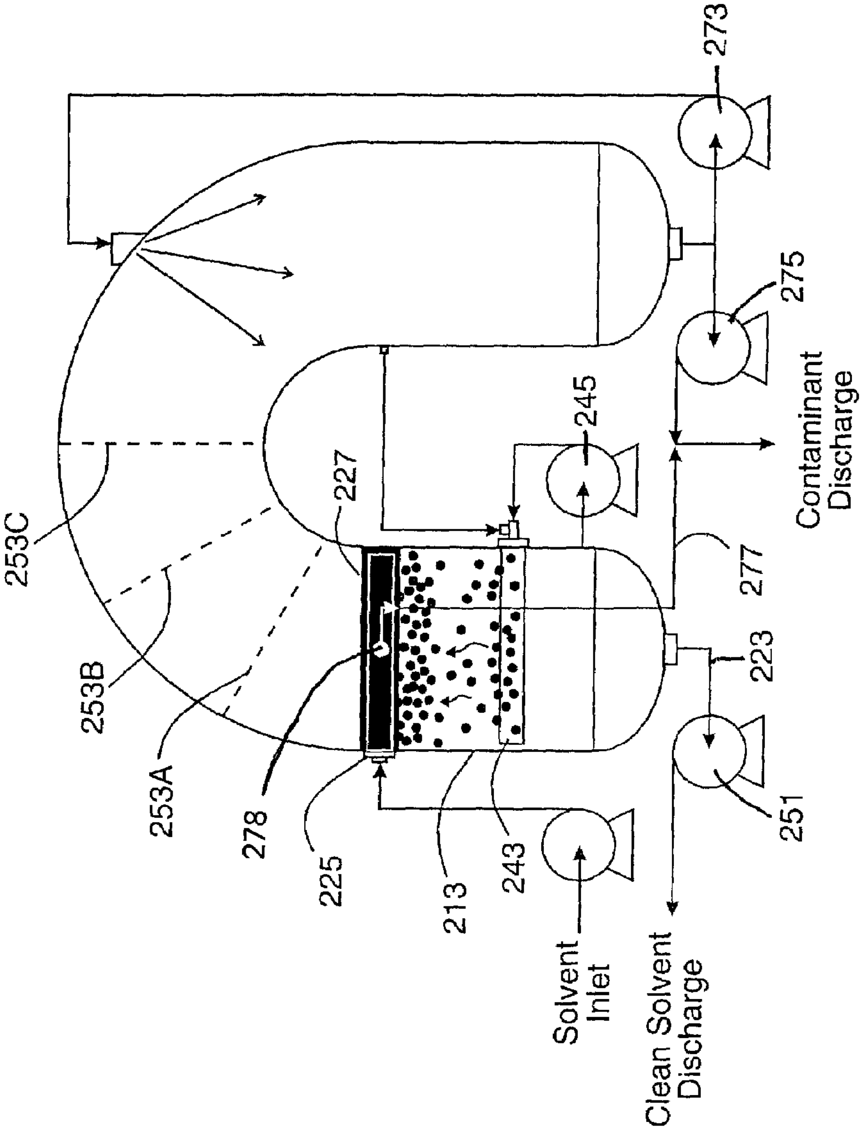
FIG. 11 is a side view of the apparatus, with a liquid-liquid separator and a sparger, showing during liquid coalescing.

FIG. 11 shows the apparatus 211 in accordance with another embodiment, wherein the liquid-liquid separator 225 and sparger 243 are provided. If the solvent contains any immiscible liquids, such as oil, then preferably these liquids should be cleaned from the solvent. The solvent is injected into the first column 213 via the liquid-liquid separator 225, which separator coalesces the contaminant liquids such as oil. In addition, the pumparound sparger 243 acts as a liquid-liquid separator. In fact, because the flow rate through the sparger 243 is higher than through the separator 225, much of the contaminant liquids are likely to be separated by the sparger.

The solvent and immiscible liquid enters the pipe 229 of the separator 225, 243 and passes through the steel wool. The oil droplets are slowed from impacting the wire structure of the steel wool. The slowed oil droplets are impacted by other oil droplets, wherein the droplets coalesce. Some of the droplets do not impact the wire structure and pass through to a turbulent zone, where the oil droplets coalesce by impact. Once coalesced, the droplets settle or migrate to the surface level 227. The gas bubbles assist in the surface migration. The drain line 277 can be opened to remove the liquid contaminants from the surface level 227.

The foregoing disclosure and showings made in the drawings are merely illustrative of the principles of this invention and are not to be interpreted in a limiting sense.

What is claimed is:

1. A facility for processing hydrocarbons utilizing solvent to remove contaminants from the hydrocarbons, the solvent containing foaming agents, comprising:

a) a fluid-liquid contactor having a hydrocarbon input, a hydrocarbon output, a lean solvent input and a rich solvent output;

b) a solvent recycler connected between the lean solvent input and the rich solvent output, the solvent recycler processing rich solvent exiting through the rich solvent output into lean solvent for introduction into the contactor by way of the lean solvent input;

c) a column having a top end and having a solvent inlet in a first location, the column having a gas inlet in a second location that is below the first position, wherein gas bubbles up through the solvent in the column, the column having a solvent output in a third location located below the second location, the solvent input and solvent output being connected to the solvent recycler;

d) an outlet in the column located at a liquid surface level of the column, wherein contaminants can be removed through the outlet from the column.

2. The facility of claim 1 wherein the gas inlet is connected to a gas outlet that communicates with a location of the column that is above the liquid level, the gas outlet being located so as not to draw in liquid, the gas being educted into the column at the gas inlet with a flow of solvent taken from the column.

3. The facility of claim 2 further comprising a liquid-liquid separator located at either the solvent inlet, the gas inlet or both.

4. The facility of claim 1 further comprising at least one concentrator located in the column above the liquid surface level, so that when foam is generated in the column, the foam will pass through the concentrator.

5. The facility of claim 1 further comprising a liquid-liquid separator located at the solvent inlet.

6. The facility of claim 5 wherein the liquid-liquid separator comprises a perforated tube wrapped with a screen.

7. The facility of claim 1, wherein:

a) the gas inlet is connected to a gas outlet that communicates with a location of the column that is above the liquid level, the gas outlet being located so as not to draw in liquid, the gas being educted into the column at the gas inlet with a flow of solvent taken from the column;

b) at least one concentrator located in the column above the liquid surface level so that when foam is generated in the column, the foam will pass through the concentrator;

c) a liquid-liquid separator located at the solvent inlet.

8. A facility for processing hydrocarbons utilizing solvent to remove contaminants from the hydrocarbons, the solvent containing foaming agents, comprising:

a) a fluid-liquid contactor having a hydrocarbon input, a hydrocarbon output, a lean solvent input and a rich solvent output;

b) a solvent recycler connected between the lean solvent input and the rich solvent output, the solvent recycler processing rich solvent exiting through the rich solvent output into lean solvent for introduction into the contactor by way of the lean solvent input;

c) a column having a top end and having a solvent inlet in a first location, the column having a gas inlet in a second location that is below the first position, wherein gas bubbles up through the solvent in the column, the column having a solvent output in a third location located below the second location, the solvent input and solvent output being connected to the solvent recycler;

d) the gas inlet is connected to a gas outlet that communicates with a location of the column that is above the liquid level, the gas outlet being located so as not to draw in liquid, the gas being educted into the column at the gas inlet with a flow of solvent taken from the column.

9. The facility of claim 8 further comprising at least one concentrator located in the column above the liquid surface level, so that when foam is generated in the column, the foam will pass through the concentrator.

10. The facility of claim 8 further comprising a liquid-liquid separator located at either the solvent inlet, the gas inlet or both.

11. The facility of claim 10 wherein the liquid-liquid separator comprises a perforated tube wrapped with a screen.

12. A facility for processing hydrocarbons utilizing solvent to remove contaminants from the hydrocarbons, the solvent containing foaming agents, comprising:

a) a fluid-liquid contactor having a hydrocarbon input, a hydrocarbon output, a lean solvent input and a rich solvent output;

b) a solvent recycler connected between the lean solvent input and the rich solvent output, the solvent recycler processing rich solvent exiting through the rich solvent output into lean solvent for introduction into the contactor by way of the lean solvent input;

c) a column having a top end and having a solvent inlet in a first location, the column having a gas inlet in a second location that is below the first position, wherein gas bubbles up through the solvent in the column, the column having a solvent output in a third location located below the second location, the solvent input and solvent output being connected to the solvent recycler;

d) at least one concentrator located in the column above the liquid surface level so that when foam is generated in the column, the foam will pass through the concentrator.

13. The facility of claim 12 wherein the concentrator is a first concentrator, further comprising a second concentrator located in the column with the first concentrator being between the second concentrator and the liquid surface level, the first concentrator being coarser than the second concentrator.

14. The facility of claim 13 further comprising a third concentrator located in the column with the second concentrator being interposed between the first and third concentrators, the third concentrator being coarser than the second concentrator.

15. The facility of claim 12 wherein the concentrator is oriented so as to allow liquid on the concentrator to drain back into the column.

16. The facility of claim 12 wherein the concentrator comprises a perforated member.

17. The facility of claim 12 wherein the concentrator comprises vanes so as to lengthen the distance the foam travels through the column.

18. The facility of claim 12 further comprising a liquid-liquid separator located at the solvent inlet.

* * * * *